RUST & BUZZEE.
Rubber Cutting Machine.
No. 58,028.
Patented Sept. 11, 1866.
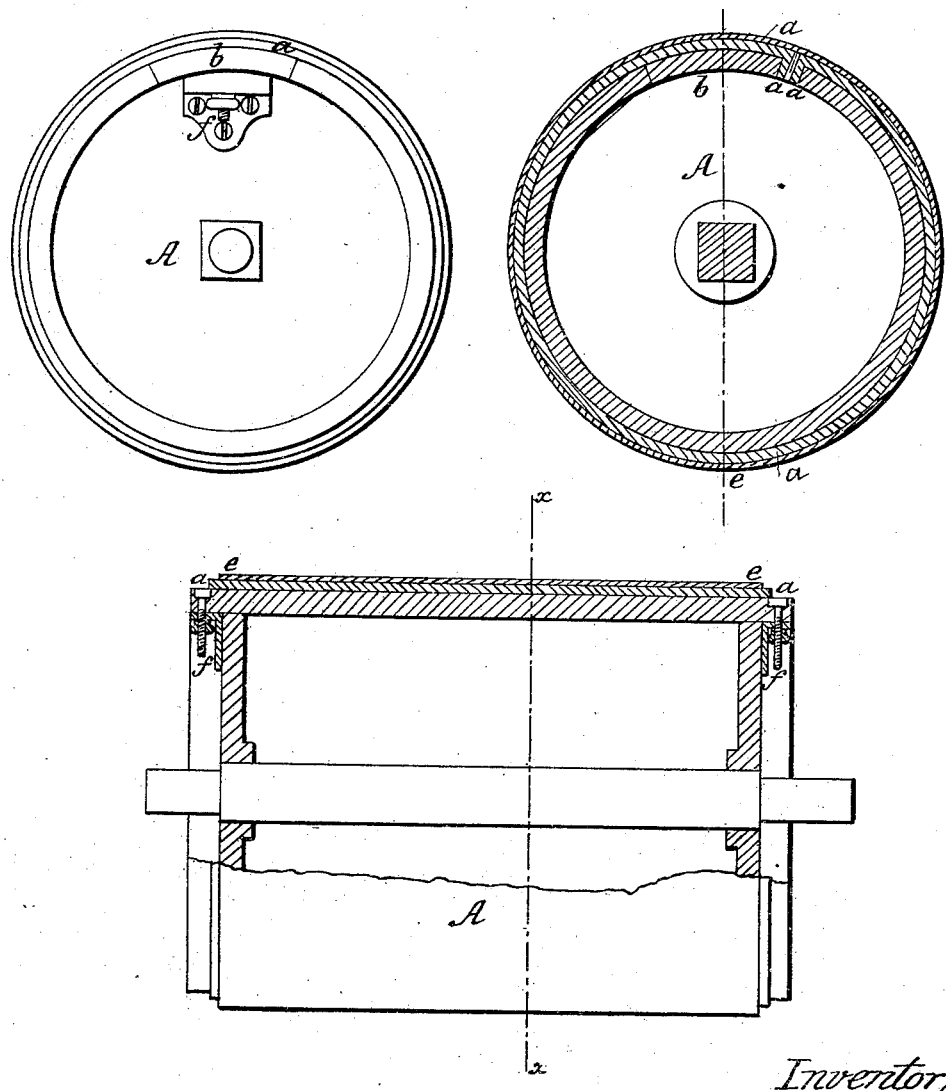

UNITED STATES PATENT OFFICE.

D. W. RUST AND GEORGE BUZZEE, OF EAST HAMPTON, MASSACHUSETTS, ASSIGNORS TO THE EAST HAMPTON RUBBER THREAD COMPANY, OF SAME PLACE.

IMPROVEMENT IN MACHINES FOR CUTTING RUBBER INTO THREADS.

Specification forming part of Letters Patent No. 58,028, dated September 11, 1866.

*To all whom it may concern:*

Be it known that we, D. W. RUST and GEORGE BUZZEE, of East Hampton, Hampshire county, Massachusetts, have invented a new and useful Improvement in Cutting Rubber Threads; and we do hereby declare that the following is a full, clear, and exact description thereof, which will enable those skilled in the art to make and use the same, reference being had to the accompanying drawings forming part of this specification, in which—

Figure 1 represents a partial section of a wooden cylinder, on which the sheet rubber is cut into threads, taken in the line $y\ y$, Fig. 2. Fig. 2 is a cross-section in the line $x\ x$, Fig. 1; Fig. 3, an end view of the cylinder.

Similar letters of reference indicate like parts.

By the ordinary method of cutting rubber into threads or narrow strips the vulcanized sheet-rubber of any desired width and length— say, thirty to thirty-five inches wide and thirty to thirty-five yards long—is wound around a wooden cylinder from three to four feet in diameter. The cylinder is placed in a lathe and made to revolve against a circular revolving knife, which moves sidewise or longitudinally with the cylinder by means of suitable gearing to cut down through the successive sheets of rubber to the wooden surface of the cylinder. To cut the rubber, it is necessary to keep a stream of water running on the knife, which causes the wood of the cylinder to swell and make the surface uneven. On this account the knife often fails to cut the lower folds of rubber perfectly, and the surface of the cylinder is soon spoiled for the work.

This invention or discovery obviates this difficulty. It consists in employing a material for covering the cylinder to cut upon which is impervious to water, and is readily replaced without much cost, while at the same time the foundation is firm enough to bear the pressure of the knife and receive the incision through the bottom fold of the sheet cut into threads without injury to its edge. For this purpose we use, in preference to any other soft elastic material, a covering of mixed or partially-cured rubber, although any other suitable material impervious to water may be employed. Such a foundation not being affected by the water required for cutting rubber threads, they are all cut upon it perfectly without failure in penetrating the lower folds of the sheet, and consequently without loss of material. When the foundation is cut up or worn out in use it is renewed at small expense, and particularly by employing mixed rubber, which may be reground and worked over.

A is a cylinder such as is commonly employed for the purpose of cutting rubber threads upon, differing only in the arrangement for fastening and securing the foundation to the surface evenly and smoothly, as required.

To fasten the foundation-sheet of rubber $a\ a$ to the face of the cylinder, a stave, $b$, is fitted in it loosely, leaving space enough longitudinally to admit a double fold of the foundation-sheet $a\ a$, as shown in Fig. 3, in section, for the purpose of fastening the ends of the sheet to the face of the cylinder, and thus forming a continuous smooth surface upon the periphery, and also for catching and holding the end of the rubber sheet $e$, which is to be cut into threads when wound upon the cylinder. The loose stave $b$ is secured and drawn into place by set-screws $f\ f$, one at each end of the cylinder. The cylinder, being thus covered with a firm but soft foundation, impervious to water, is ready for receiving the sheet-rubber to be cut into threads in the ordinary way.

Having thus described our invention or discovery, what we claim as new, and desire to secure by Letters Patent, is—

Covering a cylinder with mixed rubber or other equivalent material, as a foundation upon which to cut rubber threads, substantially in the manner and for the purposes herein specified.

D. W. RUST.
GEORGE BUZZEE.

Witnesses:
SETH WARNER,
ALBERT WARNER.